(12) United States Patent
Seager et al.

(10) Patent No.: US 8,041,722 B2
(45) Date of Patent: Oct. 18, 2011

(54) REFINING COLLECTIONS OF ENTITIES IN A SERVICE REGISTRY ENVIRONMENT

(75) Inventors: David J. Seager, Winchester (GB); Martin J. Smithson, Wherwell (GB)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 12/246,582

(22) Filed: Oct. 7, 2008

(65) Prior Publication Data

US 2010/0088324 A1    Apr. 8, 2010

(51) Int. Cl.
G06F 7/00 (2006.01)

(52) U.S. Cl. .................. 707/754; 709/201

(58) Field of Classification Search .......... 707/754; 709/201
See application file for complete search history.

(56) References Cited

U.S. PATENT DOCUMENTS

| | | | |
|---|---|---|---|
| 2004/0193673 A1* | 9/2004 | Samji et al. | 709/200 |
| 2005/0091174 A1 | 4/2005 | Akkiraju et al. | |
| 2006/0200466 A1* | 9/2006 | Kaasten et al. | 707/7 |
| 2007/0261066 A1 | 11/2007 | Miyamoto et al. | |
| 2007/0300240 A1 | 12/2007 | Viegener et al. | |

* cited by examiner

Primary Examiner — Shahid Alam
Assistant Examiner — Fazlul Quader
(74) Attorney, Agent, or Firm — Cantor Colburn LLP; Andre Gibbs

(57) ABSTRACT

A method for factorizing a property metadata filter in a service registry includes receiving a user's request for factorizing a property metadata with a specific name and value in a registry; generating a new filter for the property metadata with the specific name and value; applying the new filter to a search that has other filters; determining whether the search has an existing filter for name only, where the name is equal to the name in the new filter; and determining whether the search has an existing filter for value only, where the value is equal to the value in the new filter.

2 Claims, 7 Drawing Sheets

REFINING COLLECTIONS OF ENTITIES IN A SERVICE REGISTRY ENVIRONMENT

BACKGROUND

This invention relates generally to service oriented architectures, and more particularly to a system, article, and method for successively refining a collection of entities in a service registry environment.

Service Oriented Architecture (SOA) is a development of distributed computing and modular programming in which existing or new technologies are grouped into autonomic systems. SOAs employ software services to build applications. Services are relatively large, intrinsically unassociated units of functionality with externalized service descriptions. SOAs typically implement functionalities most humans would recognize as a service, such as filling out an online application for an account, viewing an online bank statement, or placing an online booking or airline ticket order. Thus, SOA serves to align business and information technology (IT).

In an SOA environment, instead of services embedding calls to each other in their source code, protocols are defined that describe how one or more services may talk to each other. In an SOA environment, one or more services communicate with one another by passing data from one service to another, or coordinate an activity between one or more services. In addition, independent services may be accessed without the knowledge of the underlying platform implementation. In this manner, autonomic services may be orchestrated into higher-level services. In SOA, the application architecture has all its functions and services defined using a description language having invokable interfaces that are called to perform business processes. In SOA, each interaction is independent of each and every other interaction, and the interconnect protocols of the communicating devices (i.e., the infrastructure components that determine the communication system do not affect the interfaces). Because interfaces are platform-independent, a client from any device using any operating system in any language may use the service.

A current challenge in SOA development is to build business driven composite services atop of autonomic informational services. By defining a methodology for the use and re-use of software services and business processes, which typically encompass multiple service invocations, SOA has the potential to provide a great deal of flexibility and cost savings to enterprises that rely on information technology (IT).

The SOA concept is based upon an architectural style that defines an interaction model between three primary building blocks: a) a service provider, which publishes a service description and provides the implementation for the service; b) a service requester, which can either use the uniform resource identifier (URI) for the service description directly, or find the service description in a service registry and bind and invoke the service; and c) a service broker, which provides and maintains the service registry using, for example, the Universal Description Discovery and Integration (UDDI) specification, which defines a way to publish and discover information about web services.

A web service is a software application designed to support interoperable machine-to-machine interaction over a network, and is frequently simple web application program interfaces (API) that may be accessed over a network, such as the Internet, and executed on a remote system hosting the requested services. Web services may provide an example of an SOA implementation in which the basic unit of communication is a message, rather than an operation, by making functional building blocks accessible over standard Internet protocols that are independent from platforms and programming languages.

WebSphere® is an SOA software offering of International Business Machines Corporation (IBM). WebSphere is designed to set up, operate, and integrate electronic business (e-business) applications across multiple computing platforms using Java-based Web technologies. Electronic business methods enable companies to link their internal and external data processing systems more efficiently and flexibly, to work more closely with suppliers and partners, and to better satisfy the needs and expectations of their customers. WebSphere® includes both the run-time components, such as WebSphere® Application Server (WAS), and the tools to develop applications that will run on WAS.

While service oriented architecture (SOA) has the potential to drive business agility, business-process vitality, reuse of existing services, improved connectivity and closer alignment of information technology (IT) to business, making the most of SOA potential depends on how well the services are governed and managed in an SOA. Businesses without proper governance and management risk losing control over their services, and face barriers to reusing services, such as redundant services, misalignment with business processes, and lack of application consistency and integrity.

IBM's WebSphere® Service Registry and Repository (WSRR) provides management and governance capabilities that enable an enterprise to get the most business value from their SOA. WSRR facilitates storing, accessing and managing service information, called service metadata, so that users can easily select, invoke, govern and reuse their services.

The publish and find capabilities of WebSphere® Service Registry and Repository promote service reuse in SOA projects by providing greater visibility of and easier access to existing services. A Service discovery engine discovers services on both IBM WebSphere® Application Server and Microsoft® .NET platforms, allowing an enterprise to keep an accurate record of deployed services in their SOA. Faceted search provides a natural and user-friendly way to find services by allowing a user to progressively refine search results using attributes, document types or classification. The WebSphere® Service Registry and Repository helps in rapidly creating or modifying business processes using existing services. WSRR has a query mechanism that allows a user to search and find the services that best fit the requirements of a given process.

WebSphere® Service Registry and Repository enables dynamic and efficient access to services information by both runtime applications and processes that facilitate better connectivity and efficiency. WSRR increases runtime flexibility of applications integrated by an enterprise service bus (ESB) by enabling selection of services based on service metadata. WSRR manages the service metadata, as well as service interactions, dependencies and redundancies. WSRR classifies services based on business objectives, manages policies for service usage, and monitors how services are changed and versioned. WSRR also links related binary documents (such as Microsoft Word and Adobe Portable Document Format (PDF) files to service metadata. The linkage capability provided by WSRR helps optimize the use of services in an SOA by exchanging rich service metadata with runtime monitoring tools and operational data stores.

SUMMARY

Embodiments of the present invention provide a method for factorizing a property metadata filter in a service registry, the method includes: receiving a user's request for factorizing a property metadata with a specific name and value in a registry; generating a new filter for the property metadata with the specific name and value; applying the new filter to a search that has other filters; determining whether the search has an existing filter for name only, where the name is equal to the name in the new filter; wherein in the event the search does not have an existing filter for name only; determining whether the search has an existing filter for value only, where the value is equal to the value in the new filter; wherein in the event the search does have an existing filter for name only, where the name is equal to the name in the new filter: removing the existing filter from the search; and determining whether the search has an existing filter for value only, where the value is equal to the value in the new filter; wherein in the event the search has an existing filter for value only, where the value is equal to the value in the new filter: removing the existing filter from the search; adding the new filter to the search; and wherein in the event the search does not have an existing filter for value only, where the value is equal to the value in the new filter: adding the new filter to the search.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
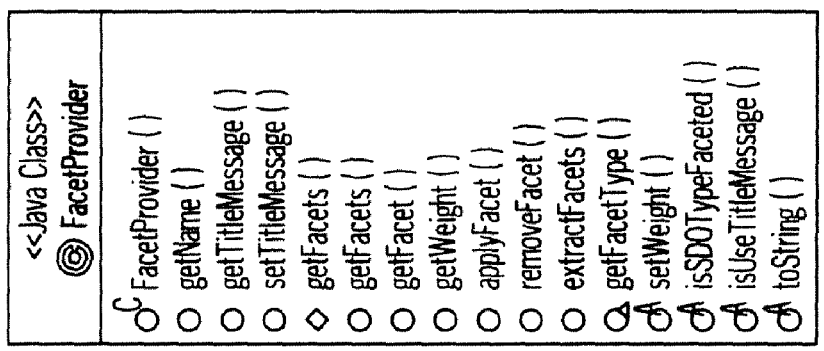
FIG. 1 is a unified modeling language (UML) diagram of a FacetProvider abstract base class within a WSRR according to embodiments of the invention.

The detailed description explains the preferred embodiments of the invention, together with advantages and features, by way of example with reference to the drawings.

DETAILED DESCRIPTION

Presently there are a number of applications that provide users with the ability to refine a collection of items by applying cumulative filters to the collection. As each filter is applied the number of items in the collection is gradually reduced as the elements in the collection that do not match the filter are removed. When presented with a large collection of items this filtering technique allows users to 'drill down' to find the item or items that they are interested in. An example of such an application is the web based user interface for IBM's Rational Asset Manager (RAM). RAM is a collaborative software development asset management solution that supports the Reusable Asset Specification (RAS) and enables organizations to identify, manage and govern the design, development and consumption of software assets, including services as part of a SOA initiative.

Traditionally, the functionality to refine a collection of items with filters has been implemented in one of two approaches. In the first approach, the items in the collection are retrieved from a fixed list and filtered in memory. The problem associated with the first approach is that filtering is done in memory, and thus changes on the server are not reflected when filtering occurs. In the second approach, an algorithm that extracts the filters from the result set is implemented as a single, monolithic, process or function. The problem with the second solution is that the filters may be based on various attributes of the items in the result set. Adding a new type of filter to the application would require changes to the application code and is, therefore, not a flexible solution.

Embodiments of the invention provide a method and system that filter web service definitions, as well as other types of information that may be stored in a service registry. The filters provided by embodiments of the invention execute within the service registry itself, and are centrally located within the service registry, and are not provided as add-ons to the web service itself. The filters provided by embodiments of the invention operate on metadata that is associated with artifacts in the service registry in order to refine the collection of artifacts.

Embodiments of the invention define a framework for various types of filter providers to be registered with an application declaratively. In embodiments of the invention, in the event an application is displaying a collection of objects (usually as the result of a search), the invention embodiment delegates responsibility for extracting the filters from the objects to each of the registered filter providers. Each filter provider is configured to inspect each of the objects and generate filters of a specific type. For example, a Classification Filter Provider will inspect the classifications for each object, and generate one or more classification based filters for display, while a Document Type Filter Provider will inspect the type of each object and generate document type based filters (if appropriate).

Embodiments of the invention are configured with a classification system that is arranged in a hierarchy of classes, with parent and child classes. A class represents a specific classification which may be applied to an entity, for example a "Service" class would be applied to entities in a registry which represented a Service of some sort. Given a specific class, a class which is above it in the hierarchy is its superclass. A class which is below it in the hierarchy is its subclass. For example a hierarchy describing fruit may consist of a top-level class of "Fruit" with a subclass of "Fleshy", "Fleshy" with a subclass of "Berry", "Berry" with a subclass of "Orange". (Hierarchically: "Fruit"->"Fleshy"-> "Berry"->"Orange") In this scheme "Fleshy" is a subclass of "Fruit", "Fruit" is a superclass of "Fleshy", "Orange" is a subclass of "Fruit" and "Fruit" is a superclass of "Orange". "Berry" is the immediate superclass of "Orange" and "Orange" is the immediate subclass of "Berry".

In implementations of embodiments of the invention in a WebSphere® Service Registry and Repository, filterable collections are generated as a result of a search, which is represented as an extensible markup language (XML) Path Language (Xpath) expression. XPath is a language for selecting nodes from an XML document. In addition, XPath may be used to compute values (strings, numbers, or Boolean values) from the content of an XML document.

In embodiments of the invention this XPath search is modeled and stored by the system as a Java object tree. In an application configured with embodiments of the invention, a framework allows different types of filter providers to be registered with the application declaratively. In the event an application is searching for a collection of objects (with various filters applied), the application uses the XPath search model to create the search to execute.

In the event a filter is applied an application, according to embodiments of the invention, delegates responsibility for modifying the XPath model to apply the filter to each of the registered filter providers. Each filter provider is then able to generate a predicate of the appropriate type to refine the search. For instance, in the event a user clicks on a particular classification: a Classification Filter Provider will apply or modify a predicate to look for objects classified by this classification. A Document Type Filter Provider will modify the type being searched for to restrict to the document type applied. The system will then execute the resultant search XPath to display a new collection, filtered by the applied filter.

In the event a filter is removed, the application, according to embodiments of the invention, delegates responsibility for modifying the XPath model to remove the filter to each of the registered filter providers. Each filter provider is then able to remove the predicate of the appropriate type to unrefine the search. For instance, the user chooses to remove a particular classification filter: a Classification Filter Provider will modify the predicate which looks for objects classified by this classification, and will remove the specific classification from this predicate. A Document Type Filter Provider will modify the type being searched for removal of the specific document type. The system will then execute the resultant search XPath to display a new collection, no longer filtered by the removed filter.

The filter provider approach, of embodiments of the invention, is advantageous in that it enables different types of filter providers to be registered with an application without requiring changes to any of the application code. Applying embodiments of the invention in a WebSphere® Service Registry and Repository, enables the registration of different filter providers on different perspectives within a web user interface, and each filter modifies the search XPath model when applied. The addition of new filter types, using embodiments of the invention, does not require changes to the application code, and any sort of filter can be added if a filter can be represented by a modification to the XPath search.

The framework, provided by embodiments of the invention, defines a common abstract base class for all filter provider implementations. In a WebSphere® Service Registry and Repository implementation of embodiments of the invention, the filter providers are referred to as facet providers. The defined abstract base class implements some key functionality that is common to all filter providers, while also defining a number of abstract methods that each filter provider must implement. These methods provide the 'hooks' that allow WebSphere® Service Registry and Repository to invoke each filter provider at the relevant point when processing a collection of objects (this includes applying/removing a filter to/from a collection of objects as well as extracting the filters for display).

FIG. 1 is a unified modeling language (UML) diagram of a FacetProvider abstract base class within a WSRR according to embodiments of the invention. Unified modeling language is a standardized general-purpose modeling language in the field of software engineering. UML includes a set of graphical notation techniques to create abstract models of specific systems, referred to as UML model. The graphical nature of UML aids in the visualizing, specifying, constructing, and documenting the artifacts of a software-intensive system. The unified modeling language offers a standard way to write a system's blueprints, including conceptual things such as business processes and system functions as well as concrete things such as programming language statements, database schemas, and reusable software components.

Figure 2:
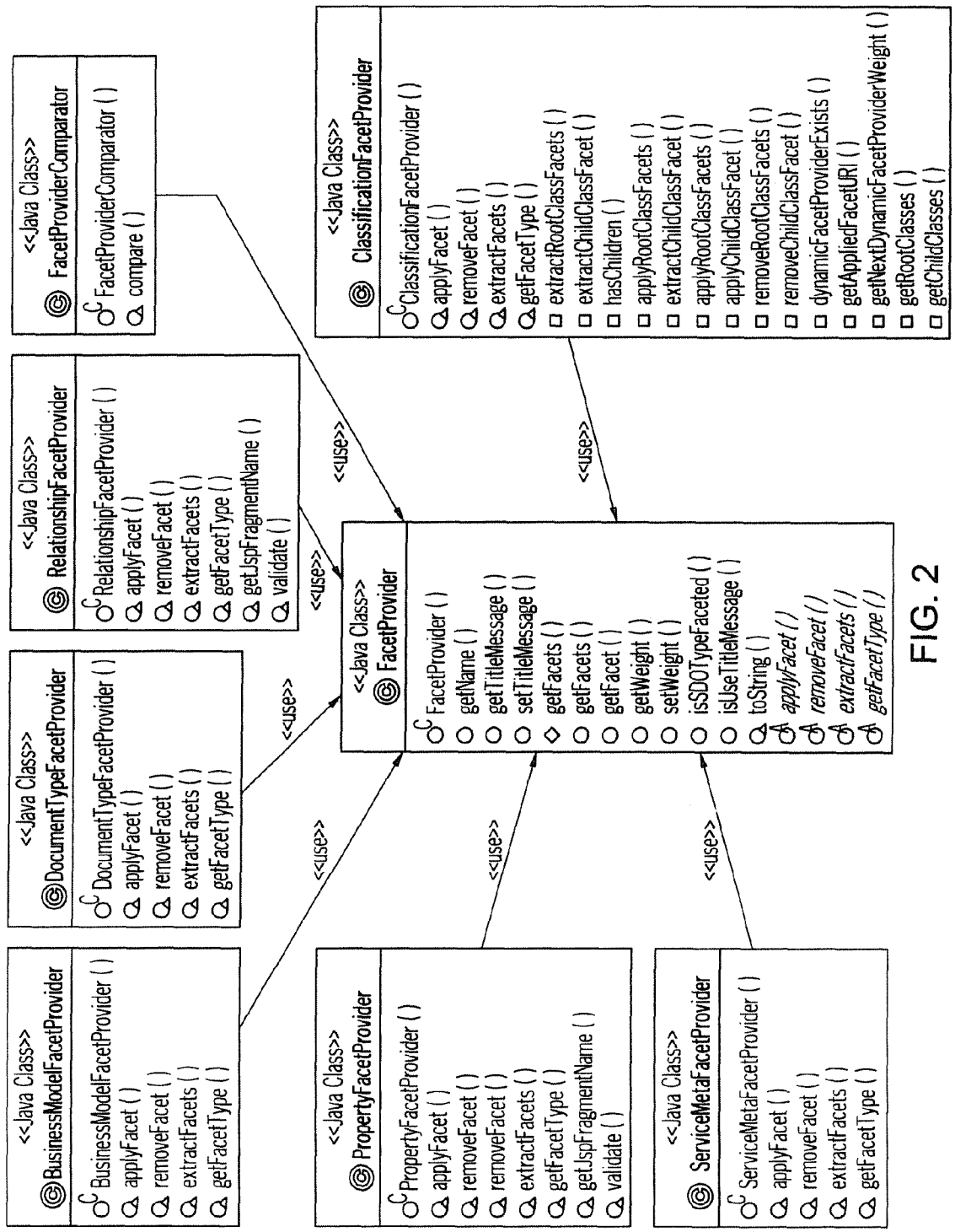
FIG. 2 is a UML diagram that illustrates facet provider implementations as provided by a WSRR according to embodiments of the invention.

FIG. 2 is a UML diagram that illustrates facet provider implementations as provided by a WSRR according to embodiments of the invention.

The applyFacet( ) method is called by an application, according to embodiments of the invention, in the event a facet provider must apply a facet. It is provided with the Java XPath model representing the current collection of items and a context, which is specific to the Facet Provider type and represents information about the filter to be applied. For example, for a classification filter, this is the Web Ontology Language (OWL) URI of the particular classification being applied. The applyFacet( ) method modifies the XPath model to apply the filter and then returns. The application then executes the XPath to produce a new collection of items.

The removeFacet( ) method is called by an application, according to embodiments of the invention, in the event a facet provider must remove a facet. The removeFacet( ) method is provided with the same information as the applyFacet( ) method. The removeFacet( ) method modifies the XPath model to remove the filter and then returns. The application then executes the XPath to produce a new collection of items.

The use XPath search, in embodiments of the invention, for searching for the items displayed in a collection, is advantageous since this search may be readily saved into the Registry as another object in the Registry, and the search may be rerun on demand. However, in the event items were refined in memory not using an XPath search expression, the rerunning of the search would not be possible.

The use of a XPath search expression allows an administrator or user to refine a collection of items for the needs of their business (e.g., show Production Services in the Finance department), and then save this search and present the saved search elsewhere, for example on the navigation tree or home page, so that other users of the Registry can immediately see the collection of items.

In addition, by modifying a search to apply filters, and because almost any collection of items in the service registry may be represented by a search, embodiments of the invention may easily filter almost any collection of items in the service registry without writing any code specific to a particular collection of items.

Examples of how the specific facet provider implementations apply facets to the XPath model are as follows.

An example of a XPath expression to retrieve all types of items in the registry which have the name of "service" is:
//*[@name="service"]

In the event a document type facet provider applies a facet to filter to only show items in the collection which are WSDLServices, the document type facet provider modifies the XPath model to:
/WSRR/WSDLService[@name="service"]

An example of a XPath expression to retrieve all WSDL Documents in the registry which have the name of "service" is:
/WSRR/WSDLDocument[@name="service"]

In the event a classification facet provider applies a facet to filter to only show items in the collection which are classified by <owl uri>, it modifies the XPath model to:
/WSRR/WSDLDocument[@name="service" AND classifiedByAllOf('<owl uri>')]

In the event a classification facet provider applies a facet to filter to also only show items in the collection which are classified by <owl uri 2>, it modifies the XPath model to:
/WSRR/WSDLDocument [@name="service" AND classifiedByAllOf('<owl uri>', <owl uri 2>')]

The framework, provided by embodiments of the invention, also defines an extensible markup language (XML) schema definition that is used to declaratively define Facet Providers to the WSRR. XML files that conform to the XML schema are created and placed in a specific sub-directory within a WSRR web user interface module. Each facet provider that is required to be registered with WSRR must provide its own XML configuration file and place it in this sub-directory. An example of a Facet Provider XML configuration file is shown in Table 1.

TABLE 1

<facet-provider-definition
xmlns="http://www.ibm.com/xmlns/prod/serviceregistry/6/1/
FacetProviderDefinition"
xmlns:xsi="http://www.w3.org/2001/XMLSchema-instance"
xsi:schemaLocation="http://www.ibm.com/xmlns/prod/serviceregistry/
6/1/FacetProvider Definition ../../../schemas/FacetProviderDefinition.xsd"
facet-provider-name="DocumentTypeFacetProvider"
page-help-topic="detail.view.wsdl"
weight="4">
<messages>
<title-message message-key="facet.provider.document.type.title"/>
</messages>
<facet-provider-class>com.ibm.sr.ui.facetproviders.-
DocumentTypeFacetProvider</facet-provider-class>
</facet-provider-definition>

Figure 3:
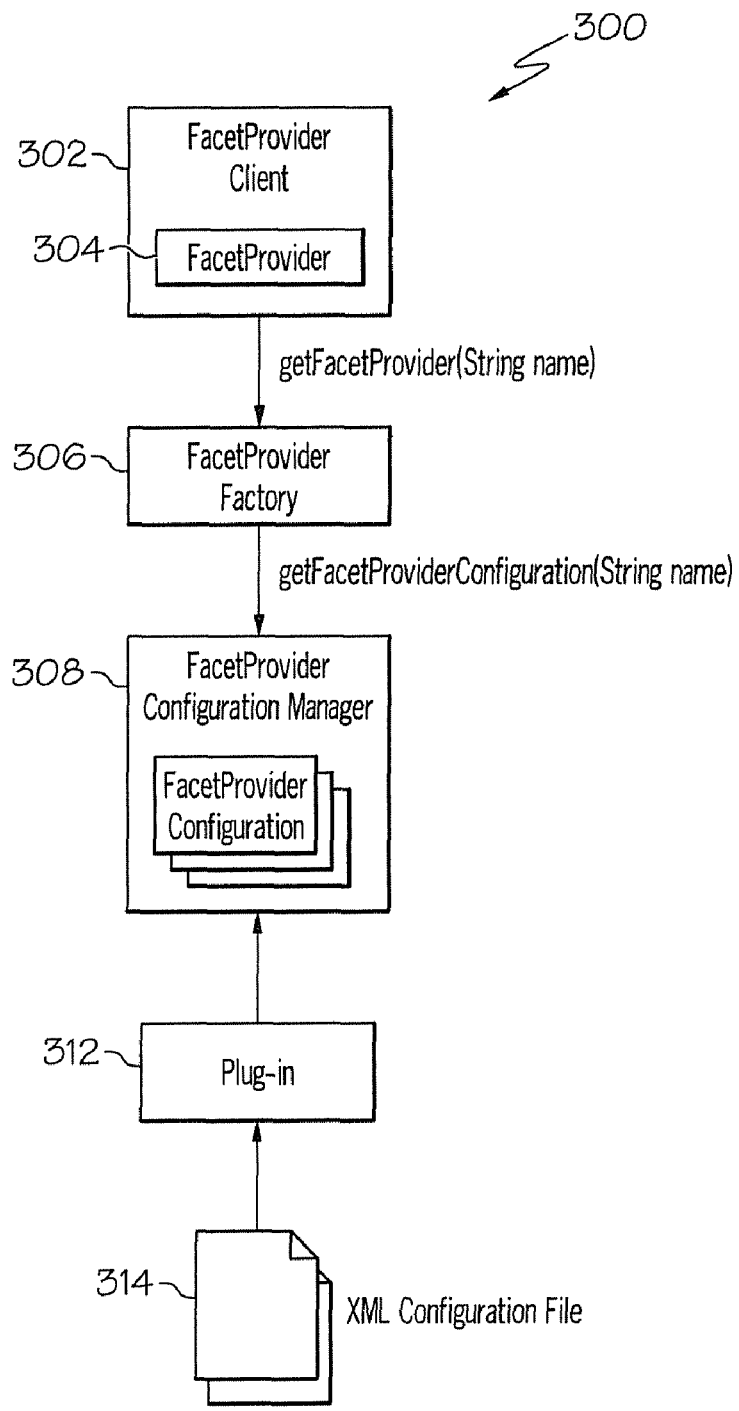
FIG. 3 is a functional block diagram illustrating a WSRR during application startup according to embodiments of the invention.

FIG. 3 is a functional block diagram illustrating a WSRR 300 during application startup according to embodiments of the invention. In embodiments of the invention during application startup, the WSRR web user interface initialization code 312 reads each Facet Provider configuration file 314 and generates an in memory representation of the information, called a FacetProviderConfiguration 310. A FacetProviderConfigurationManager class 308 manages all of the FacetProviderConfigurations 310 that are registered with WSRR 300. When a component within the WSRR web user interface 302 is required to invoke a Facet Provider 304, the component requests the FacetProvider 304 from a FacetProviderFactory class 306. This class requests the relevant FacetProviderConfiguration object 310 from the FacetProviderConfigurationManager class 308 and uses it to dynamically create a Facet Provider implementation class. Once the FacetProviderFactory 306 has created an instance of a Facet Provider implementation class, it is cached within the factory class.

Figure 4:
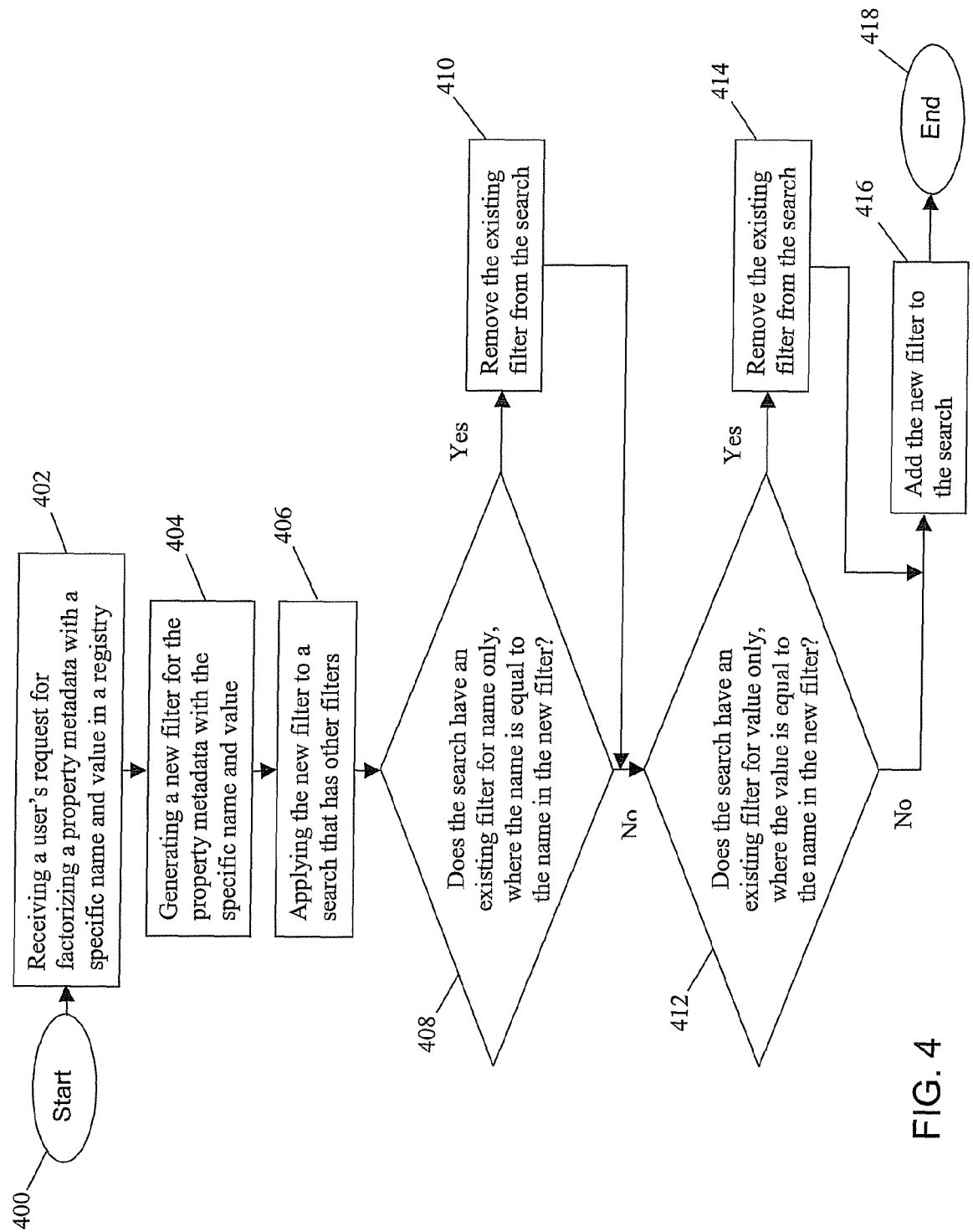
FIG. 4 is a flow diagram illustrating a process flow for factorizing a property metadata filter in a service registry according to embodiments of the invention.

FIG. 4 is a flow diagram illustrating a process flow for factorizing a property metadata filter in a service registry according to embodiments of the invention. In the process for factorizing a property metadata filter in a registry, a user filters a set of search results using a filter for a property metadata. The process starts (block 400) with a user request for factorizing a property metadata with a specific name and value in a registry (block 402), and the registry generating a new filter for the property metadata with the specific name and value (block 404). The registry applies the new filter to a search that has other filters (block 406). A determination is made of whether the search has an existing filter for name only, where the name is equal to the name in the new filter (decision block 408). In the event the search does not have an existing filter for name only (decision block 408 is No), a determination is made of whether the search has an existing filter for value only, where the value is equal to the value in the new filter (decision block 412). In the event the search does have an existing filter for name only, where the name is equal to the name in the new filter (decision block 408 is Yes), the existing filter is removed from the search (block 410), and the process continues with the determination is made of whether the search has an existing filter for value only where the value is equal to the value in the new filter (decision block 412). In the event the search has an existing filter for value only, where the value is equal to the value in the new filter (decision block 412 is Yes), the existing filter is removed from the search (block 414), the new filter is added to the search (block 416), and the process concludes (block 418). In the event the search does not have an existing filter for value only, where the value is equal to the value in the new filter (decision block 412 is No), the new filter is added to the search (block 416), and the process concludes (block 418).

Figure 5:
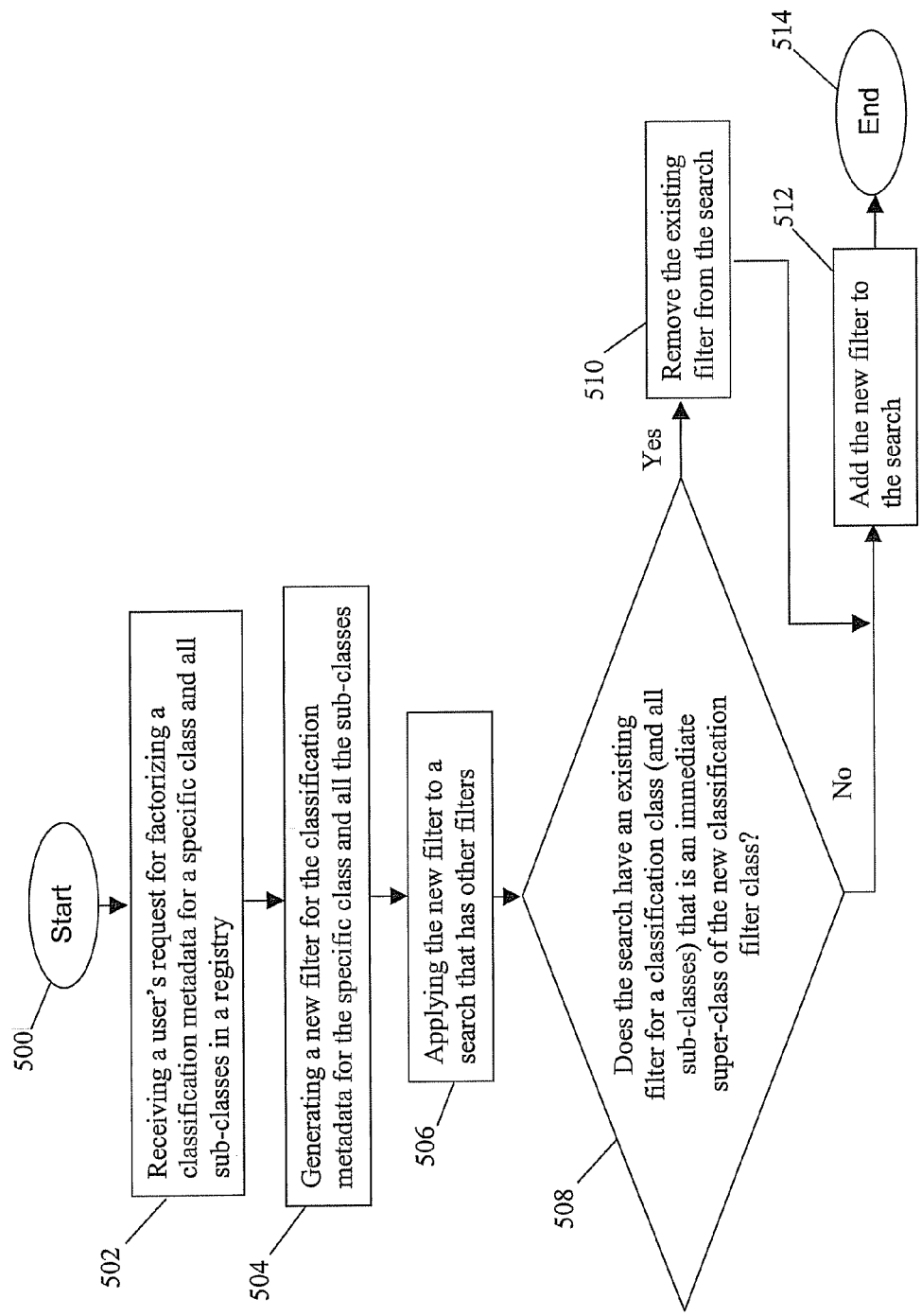
FIG. 5 is a flow diagram illustrating a process flow for factorizing a classification metadata filter in a service registry according to embodiments of the invention.

FIG. 5 is a flow diagram illustrating a process flow for factorizing a classification metadata filter in a service registry according to embodiments of the invention. In the process, a user filters a set of search results using a filter for a classification metadata in a registry. The process starts (block 500) with a user request for factorizing a classification metadata for a specific class and all sub-classes in a registry (block 502), and the registry generating a new filter for the classification metadata for the specific class and all the sub-classes (block 504). The registry applies the new filter to a search that has other filters (block 506). A determination is made of whether the search has an existing filter for a classification class (and all sub-classes) that is the immediate super-class of the new classification filter class (decision block 508). In the event the search has an existing filter for a classification class (and all sub-classes) that is a super-class of the new classification filter class (decision block 508 is Yes), the existing filter from the search is removed (block 510), and the new filter is added to the search (block 512), and the process concludes (block 514). In the event the search does not have an existing filter for a classification class (and all sub-classes) that is the immediate super-class of the new classification filter class (decision block 508 is No), the new filter is added to the search (block 512), and the process concludes (block 514).

Figure 6:
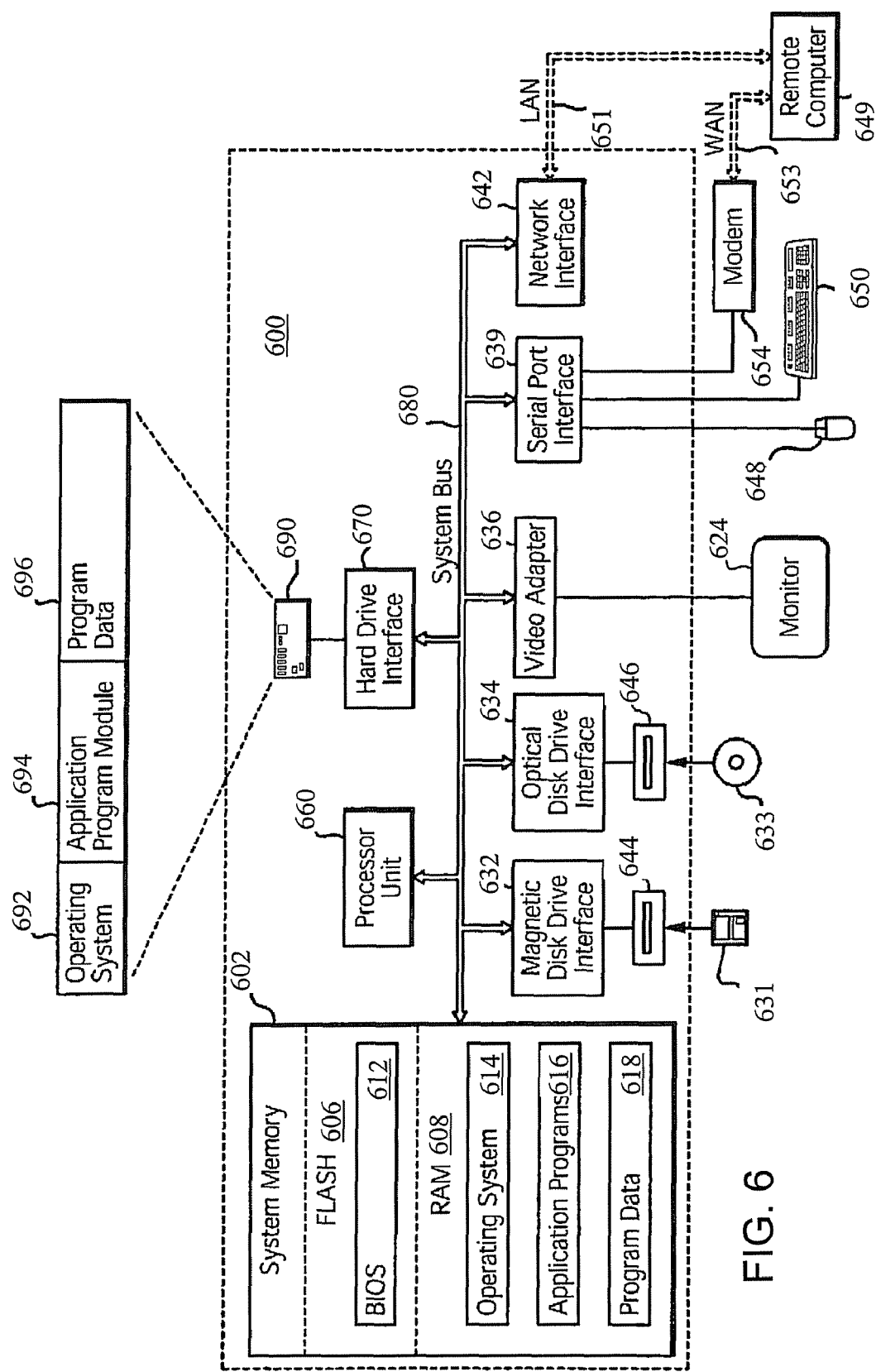
FIG. 6 is a block diagram illustrating an exemplary computer system that may be utilized to implement exemplary embodiments of the invention.

FIG. 6 and the following discussion are intended to provide a general description of an exemplary data processing system that may be adapted to implement exemplary embodiments of the invention. While exemplary embodiments of the invention will be described in the general context of an application program that runs on an operating system in conjunction with a personal computer, those skilled in the art will recognize that exemplary embodiments may also be implemented in combination with other program modules such as, for example, platform software modules, user-written software modules (such as spreadsheet templates, word processor macros, graphics scripts, etc.), routines, programs, components, data structures, etc. that perform particular tasks or implement particular abstract data types. Moreover, those skilled in the art will appreciate that exemplary embodiments of the invention may be practiced with other computer system configurations, including hand-held devices, multiprocessor systems, microprocessor-based or programmable consumer electronics, minicomputers, mainframe computers, and the like, as well as in distributed computing environments where tasks are performed by remote processing devices that are linked through a communications network. In a distributed computing environment, program modules may be located in both local and remote memory storage devices.

Referring now to FIG. 6, there is depicted an exemplary data processing system 600 that may be utilized to implement exemplary embodiments of the present invention. For discussion purposes, the data processing system is described as having features common to a personal computer, such as a desktop or portable computer. As used herein, however, the terms "data processing system," "computer," and the like are intended to mean essentially any type of computing device or machine that is capable of receiving, storing, and running a software product, including such devices as communication devices (for example, pagers, telephones, electronic books, electronic magazines and newspapers, etc.) and personal and home consumer devices (for example, handheld computers, web-enabled televisions, home automation systems, multimedia viewing systems, gaming consoles, etc.).

Data processing system 600, as provided in FIG. 6, is configured as a personal computer that generally includes a processing unit 660, a system memory 602, and a system bus 680 that couples system memory 602 to processing unit 660. The system memory 602 includes flash memory 606 and random access memory (RAM) 608. Flash memory 606 is an electrically erasable programmable read only memory (EEPROM) module that includes a basic input/output system (BIOS) 612. BIOS 612 contains the basic routines that facilitate transfer of information between elements within personal computer 600, such as during start-up.

Data processing system 600 further includes a hard disk drive 690, a magnetic disk drive 644 (which can be used to read from or write to a removable disk 631), and an optical disk drive 646 (which can be used to read a CD-ROM disk 633 or read or write to other optical media). Hard disk drive 690, magnetic disk drive 644, and optical disk drive 636 are electrically communicatively coupled to system bus 680 by a hard disk drive interface 670, a magnetic disk drive interface 632, and an optical drive interface 634, respectively. The drives and their associated computer-readable media provide non-volatile storage for data processing system 600. Although the description of computer-readable media above refers to a hard disk, a removable magnetic disk and a CD-ROM disk, it should be appreciated that other types of media that are readable by a computer, such as magnetic cassettes, flash memory cards, digital video disks, Bernoulli cartridges, and the like, may also be used in exemplary computer operating environments.

A number of program modules may be stored in the drives and RAM 608, including an operating system 614, application program modules 616 (such as, for example, word processors, design applications, and IBM's Workplace Forms suite of program modules), and program data 618. A user may enter commands and information into data processing system 600 through a keyboard 690 and a mouse 648. Other input devices (not shown) may include, for example, a microphone, joystick, game pad, satellite dish, scanner, or the like. These and other input devices are often connected to processing unit 660 through a serial port interface 639 that is coupled to system bus 680, but may be connected by other interfaces, such as a game port or a universal serial bus (USB). A monitor 624 or other type of display device is also connected to system bus 680 via an interface, such as a video adapter 636. In addition to the monitor, the exemplary computer operating environment may also include other peripheral output devices (not shown), such as speakers or printers.

Data processing system 600 may operate in a networked environment using logical connections to one or more remote computers, such as a remote computer 649. Remote computer 649 may be, for example, a server, a router, a peer device, or another common network node, and may include many or all of the elements described in relation to data processing system 600. The logical connections depicted in FIG. 6 include a local area network (LAN) 691 and a wide area network (WAN) 693.

When used in a LAN networking environment, data processing system 700 is connected to LAN 691 through a network interface 642. When used in a WAN networking environment, data processing system 600 includes a modem 694 or other means for establishing communications over WAN 693, such as the Internet. Modem 694, which may be internal or external to data processing system 600, is connected to system bus 680 via serial port interface 639. In a networked environment, program modules depicted relative to data processing system 600, or portions thereof, may be stored in the remote memory storage device. It will be appreciated that the network connections shown are exemplary and other means of establishing a communications link between the computers may be used.

Exemplary embodiments of the present invention may be implemented in conjunction with an SOA environment such as, for example, an integrated web services implementation, in which the SOA supports integration and consolidation of any number of services and processes. Web services are self-contained, self-describing, modular applications that may be described, located, and invoked over a computer network such as the World Wide Web. Web services utilize standardized interfaces and protocols (for example, a web Application Programming Interface (API)) to implement consolidation and integration methods that allow different entities or web-based applications to communicate data, logic, and processes with one another over a network. These standardized methods permit different applications to exchange resources with other entities or applications that are running on different operating systems. In an SOA environment, the SOA may define a interface through which a service-requesting or client-side party may access web services or enterprise-based services provided within an enterprise domain, specify or consolidate a set of web services or web service providers that may be invoked through the interface, and define protocols for communicating with the set of web services through the SOA interface.

Figure 7:
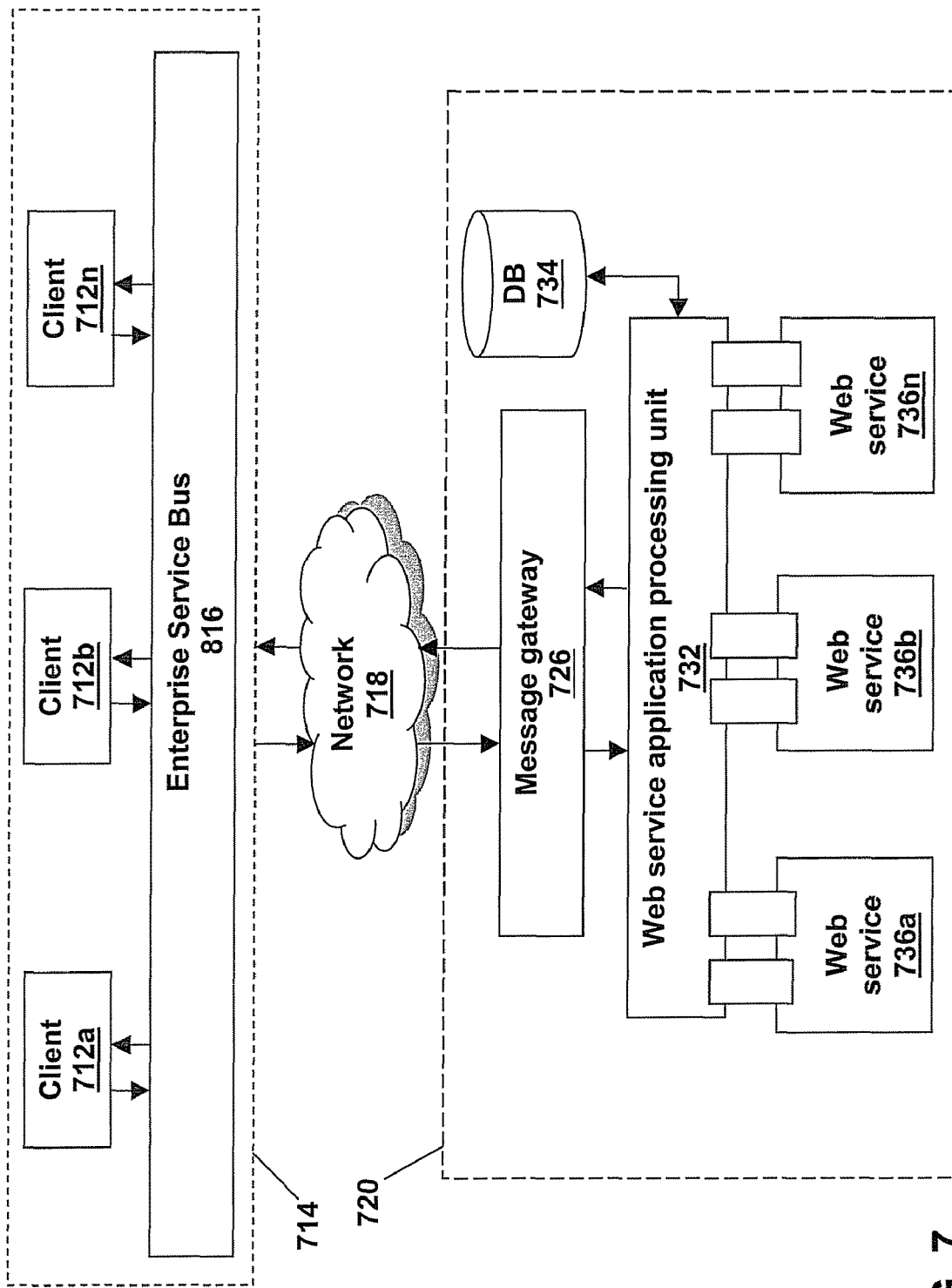
FIG. 7 is a block diagram illustrating an exemplary operational configuration of an SOA web service system for implementing embodiments of the invention.

FIG. 7 is a block diagram illustrating an exemplary SOA web service system 700 within which exemplary embodiments of the invention may be implemented and operated in a collaborative environment such as that of a business enterprise. Web service system 700 allows for the exchange or transport of web service data or web service messages between multiple client applications (712a, 712b-712n) within an enterprise domain 714 to any of multiple web services (736a, 736b-736n) hosted by a web service application server or provider 720 using an enterprise service bus (ESB) 716. In exemplary embodiments, web service system 700 may allow for the exchange or transport of web service data or web service messages between client applications 712 and a number of web service application providers that each host one or more web services over a communications network 718.

Client applications 712 are software applications that include one or more sequences of instructions that are executable by one or more processors. For example, applications 712 may be programs that are executable on a computer system such as the data processing system illustrated in FIG. 6, described above. Web services 736 may include some combination of programming and data that are made available through application server 720 for end users and other network-connected application programs. In exemplary embodiments, web services 736 may comprise one or more web applications that are implemented to allow users of client applications 712 to communicate therewith to create and store folksonomic tags for describing web content such as, for example, digital images or internet bookmarks.

When a client application needs to invoke a remote web service at application server 820, the invoking client application generates a request message describing arguments to be given to the web services, and requests processing by the web services. Upon receiving the request message, application server 720 performs the processing for the requested web services, and returns a response message describing any return values of the processing to the client application.

ESB 716, which is a component of enterprise domain 714 in the present exemplary embodiment, serves to provide an enhanced messaging middleware infrastructure for the enterprise domain and provides the set of capabilities through which the SOA may be implemented. The capabilities provided by ESB 716 may include, for example, invocation, routing, mediation, messaging, mediation, messaging, process choreography, service orchestration, complex event processing, and management functions. In general, ESB 716 serves as a centralized broker that handles issues relating to security, access, and communication in the SOA environment. In exemplary embodiments, ESB 716 may be configured to perform data integration to ensure that information is kept consistent within the SOA environment, provide a common user interface through which client applications 712 may access the web services that are specified by the SOA, and to extract policies or rules from the specified web services so that if one service is replaced with a different vendor's services in the SOA specification, the business rules do not have to be re-implemented. In alternative exemplary embodiments, ESB 716 may be a vendor-provided service bus that is external to enterprise domain 714.

In one particular exemplary capability, ESB 716 serves as a message mediator by receiving, processing, and passing request messages from client applications 712 and response messages from web services 736 such that the services can be called to perform their tasks in a standard way, without the services having foreknowledge of the calling client applications, and without the client applications having or needing knowledge of how the services actually perform their tasks. In exemplary embodiments, the message processing performed by ESB 716 may be built upon generally accepted web services standards and protocols such as, for example, XML (a markup language for describing data in message payloads in a document format), HTTP (or HTTPS, a request/response protocol between clients and servers used to transfer or convey information), SOAP (a protocol for exchanging XML-based messages over a computer network, normally using HTTP), and XACML (a markup language for expressing access control rules and policies).

ESB 716 and web services 736 communicate with each other, as well as with other applications and web service systems, through network 718. Network 718 is configured to receive and pass on request and response messages accordingly, and to use the transportation protocol or protocols used by messages. Network 718 includes intranets, extranets, and the Internet, and may contain any number of network infrastructure elements including routers, switches, gateways, etc. For example, network 718 may be the public Internet or a private LAN. In exemplary embodiments, ESB 716 may also communicate with other web service providers to provide other web services and applications through network 718 to client applications 712, as well as with enterprise service providers through an intranet within enterprise domain 714 that provide other services and processes such as enterprise legacy services to the client application.

Application server 720 provides web services 736 to client applications 712 through network 718. A web server application processing unit 732 (such as WebSphere®, a product of International Business Machines Corporation) oversees the execution of multiple web services 736a, 736b-736n that reside on application server 720. Network 718 passes each request message to and receives each response message from application processing unit 732 through a message gateway 726 such as, for example, a proxy, firewall, or other message intermediary. Message gateway 726 receives request messages from network 718 and passes response messages to the network. Message gateway 726 performs lexical analysis of request messages to create input objects including parameters for invocation of one or more of web services 736. Message gateway 726 sends input objects to web service application processing unit 732, which calls the appropriate web services that correspond to the method invocation of the input objects, executes the appropriate logic, and returns the result as output objects that include the return values of the invoked web service(s), to the message gateway. Message gateway 726 converts output objects into response messages, and transmits the response messages through network 718 to the invoking client applications.

Application processing unit 732 may also be supported by a database management system 734, which may be any conventional data repository for storing, managing, and retrieving data. In exemplary embodiments, database 734 may be a relational or object-relational database management system, such as DB2, a product of International Business Machines Corporation. In exemplary embodiments, database 734 may be internal to application server 720 (as shown in FIG. 7) or, alternatively, reside externally on a separate machine. In exemplary embodiments, application server 720 may use a single database 734 to serve multiple web services 736 (as shown in FIG. 7) or, alternatively, use a separate database for each separate web service.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A method for factorizing a property metadata filter in a service registry, the method comprising:

receiving a user's request for factorizing a property metadata with a specific name and value in a registry;

generating a new filter for the property metadata with the specific name and value;

applying the new filter to a search that has other filters;

determining whether the search has an existing filter for name only, where the name is equal to the name in the new filter;

wherein in the event the search does not have an existing filter for name only:

determining whether the search has an existing filter for value only, where the value is equal to the value in the new filter;

wherein in the event the search does have an existing filter for name only, where the name is equal to the name in the new filter:

removing the existing filter from the search; and determining whether the search has an existing filter for value only, where the value is equal to the value in the new filter;

wherein in the event the search has an existing filter for value only, where the value is equal to the value in the new filter:

removing the existing filter from the search;

adding the new filter to the search; and wherein in the event the search does not have an existing filter for value only, where the value is equal to the value in the new filter:

adding the new filter to the search.

2. A method for factorizing a classification metadata filter in a service registry, the method comprising:

receiving a user request for factorizing a classification metadata for a specific class and all sub-classes in a registry;

generating a new filter for the classification metadata for the specific class and all the sub-classes;

applying the new filter to a search that has other filters;

determining whether the search has an existing filter for a classification class and all sub-classes that is an immediate super-class of the new classification filter class;

wherein in the event the search has an existing filter for a classification class and all sub-classes that is an immediate super-class of the new classification filter class:

removing the existing filter from the search; and adding the new filter to the search; and wherein in the event the search does not have an existing filter for a classification class and all sub-classes that is an immediate super-class of the new classification filter class:

adding the new filter to the search.

* * * * *